US006957946B1

(12) United States Patent
Vander Kley

(10) Patent No.: US 6,957,946 B1
(45) Date of Patent: Oct. 25, 2005

(54) KALEIDOSCOPIC WIND MACHINE

(76) Inventor: Christopher J. Vander Kley, 609 Summit Blvd., Springfield, OR (US) 97477

( * ) Notice: Subject to any disclaimer, the term of this patent is extended or adjusted under 35 U.S.C. 154(b) by 0 days.

(21) Appl. No.: 10/459,914

(22) Filed: Jun. 11, 2003

Related U.S. Application Data

(60) Provisional application No. 60/388,546, filed on Jun. 12, 2002.

(51) Int. Cl.[7] .............................. F03B 15/06; F03D 7/00
(52) U.S. Cl. ........................ 415/4.2; 415/4.3; 415/4.4; 415/4.5; 416/61; 416/132 A; 40/479; 446/217; 446/218
(58) Field of Search ........................... 415/4.2, 4.3, 4.4, 415/4.5; 416/61, 132 A, 132 B; 40/479; 446/217, 218

(56) References Cited

U.S. PATENT DOCUMENTS

| 273,182 | A | * | 2/1883 | Sprague | .................. 416/132 B |
| 1,407,373 | A | * | 2/1922 | Brymer | ................... 416/132 B |
| 2,015,777 | A | * | 10/1935 | Belding | ................... 416/132 B |
| 4,276,033 | A | * | 6/1981 | Krovina | ................... 416/132 B |
| 6,402,472 | B1 | * | 6/2002 | Hogue et al. | ........... 416/132 A |
| 6,422,913 | B1 | * | 7/2002 | Trejo | .......................... 446/217 |

* cited by examiner

Primary Examiner—Theresa Trieu
(74) Attorney, Agent, or Firm—Robert E. Howard

(57) ABSTRACT

A kaleidoscopic wind machine for visual entertainment and other uses. The framework of the wind machine includes a vertical mast and a horizontal axle that can swivel about the mast. One or more wheel structures are rotatably attached to the horizontal axle. Each wheel structure includes a rim, a hub, and a plurality of stays extending between and attached to the rim and hub. A plurality of jib sails are attached to each wheel framework in a manner adapted to cause the wheel to rotate about the axle when the wind blows against the sails. A positioning vane is rotatably attached to the downwind end of the axle and is adapted to point the upwind end of the axle into the wind when the wind blows.

6 Claims, 5 Drawing Sheets

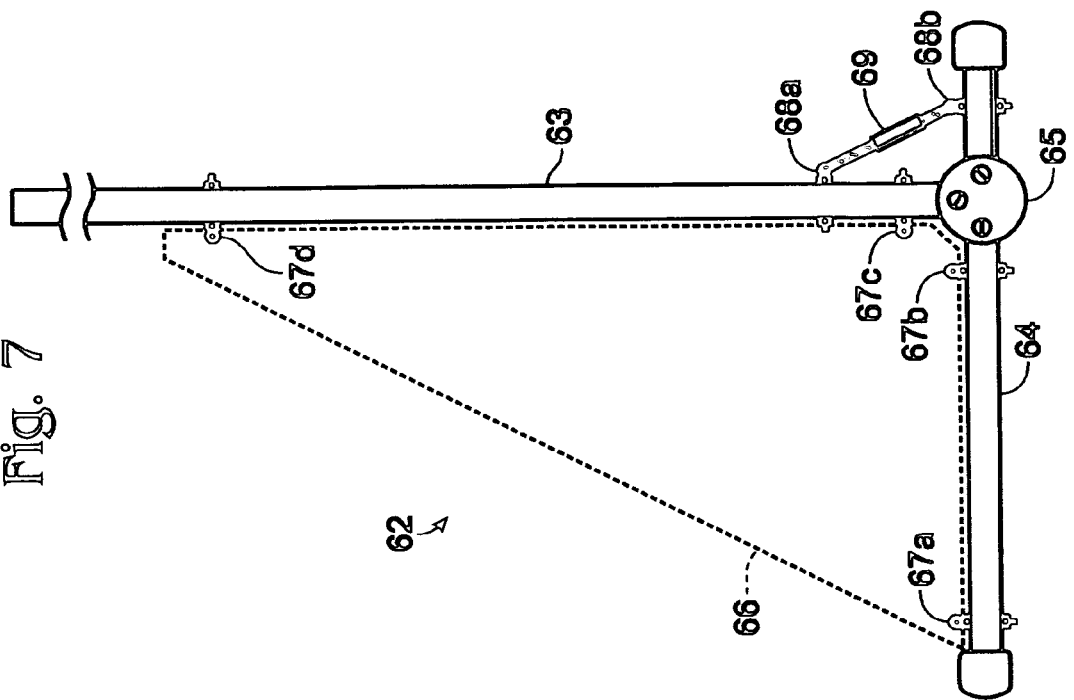
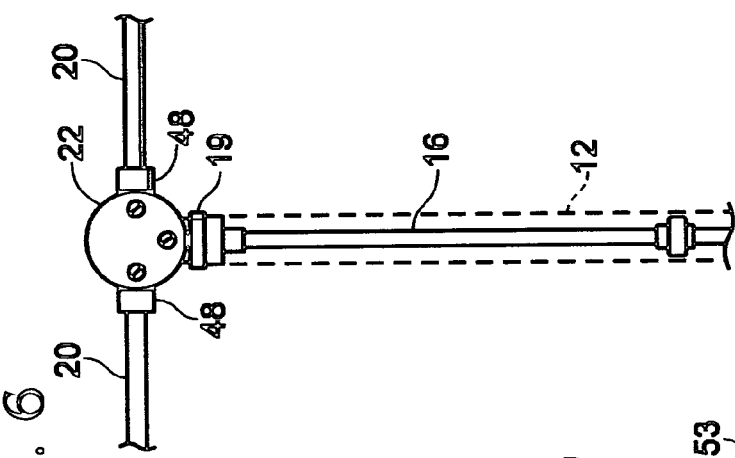
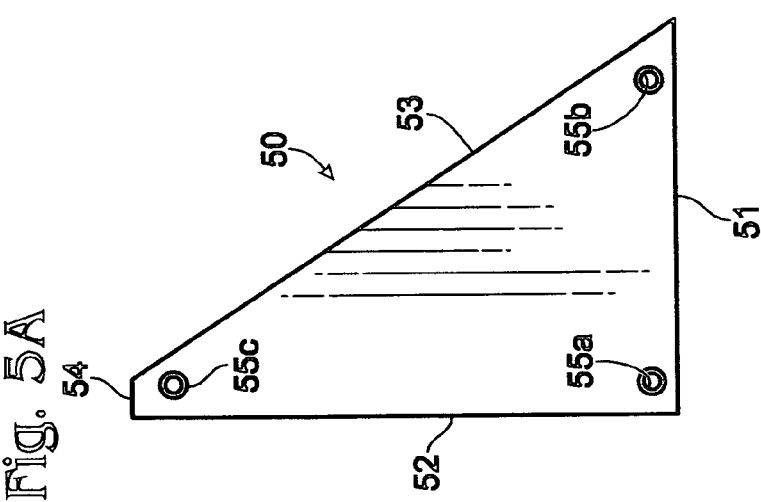

KALEIDOSCOPIC WIND MACHINE

CROSS-REFERENCE TO RELATED APPLICATIONS

This application claims the benefit of U.S. Provisional Application No. 60/388,546, filed Jun. 12, 2002.

BACKGROUND OF THE INVENTION

This invention relates to a kaleidoscopic wind machine for providing visual entertainment and other uses.

Windmills have been around since the seventh century. Such windmills use sails to capture the force of the wind and translate that force into power used to turn a grindstone or to drive a pump.

A functionally similar device is a child's pinwheel. Such toy pinwheels are hand held, and include a wheel having colored vanes of paper or plastic that is pinned to a stick, or located on an axle extending at right angles to a stick, so as to revolve around the pin or axle when blown by the wind or moved rapidly through the air by hand motion.

SUMMARY OF THE INVENTION

It is an object of the present invention to provide a kaleidoscopic wind machine on a large scale.

The kaleidoscopic wind machine of the present invention can be used for agricultural uses, such as scarecrows for deer, birds, etc., by businesses to attract customers and to show the location of the business, by schools to display the school's colors, or used purely for visual entertainment and pleasure. The rotating hub can also be connected to an electric generator or pump by a pulley and belt arrangement.

The kaleidoscopic wind machine of the present invention has one or more wheels, each wheel having a plurality of decorative jib sails which can capture the wind and cause the wheel to rotate about an axis. The sails may have different colors or designs.

The wind machine of the present invention includes a vertical mast or stanchion having a horizontal axle rotatably attached to its upper end with one or more decorative wheels rotatably attached to the axle. Each wheel includes a circular rim and a hub rotatably attached to the axle. A plurality of stays extend between the rim and the hub. A plurality of triangular sails ("jib sails") are attached to, and extend between, the hub and rim. A positioning wind vane is attached to the downwind end of the horizontal axle to keep the upwind end of the axle pointed into the wind.

BRIEF DESCRIPTION OF THE DRAWINGS

FIG. 5A is a front elevation view of a single sail of the wind machine of the present invention;

FIG. 6 is a front elevation view of the vertical/horizontal axle subassembly of the wind machine of the present invention;

FIG. 7 is a side elevation view of one of the rudder sails and associated framework of the wind machine of the present invention.

DESCRIPTION OF PREFERRED EMBODIMENTS

Figure 1:
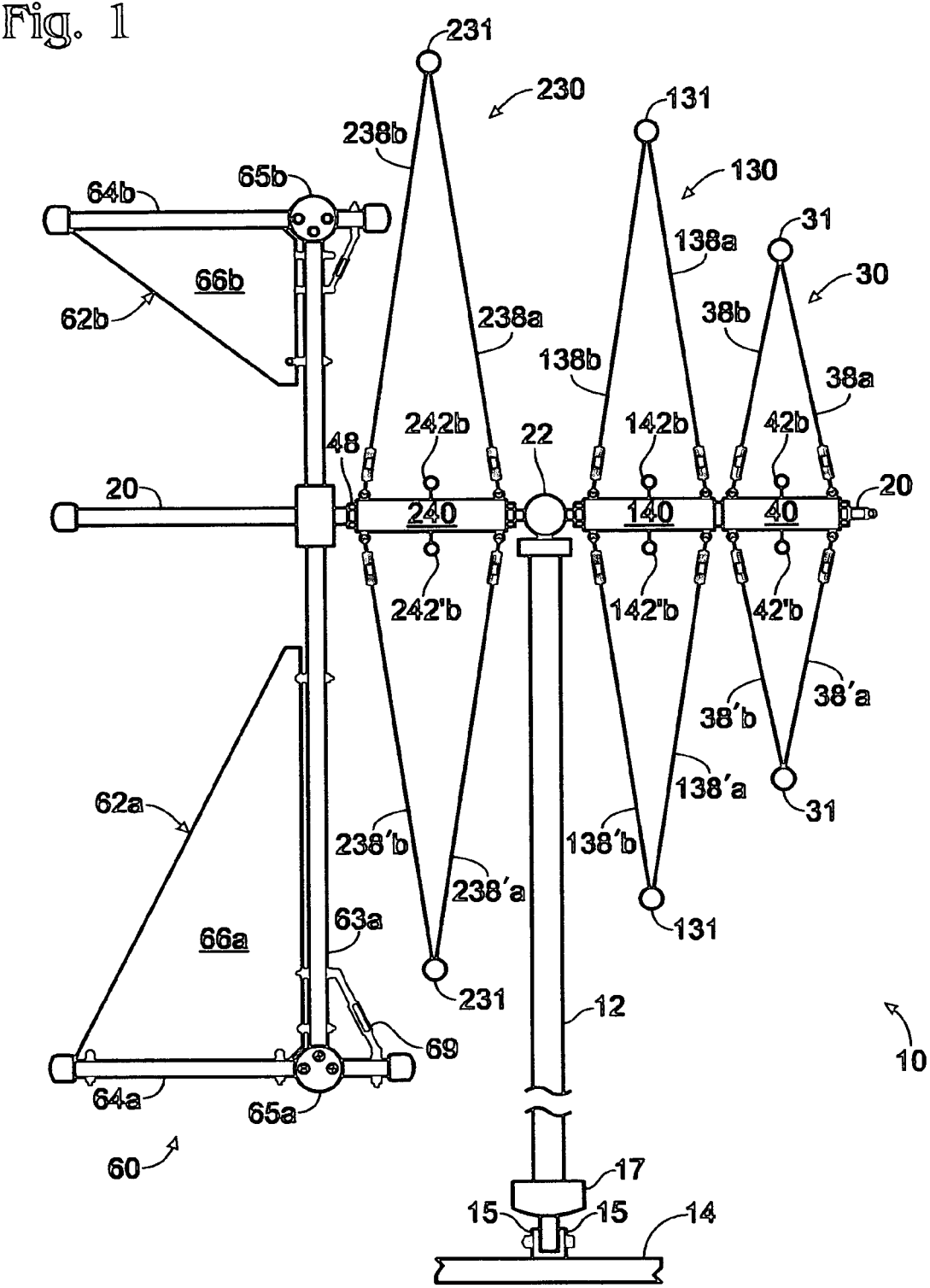
FIG. 1 is a side elevation view of the framework of the wind machine of the present invention, shown without the jib sails.
Figure 2:
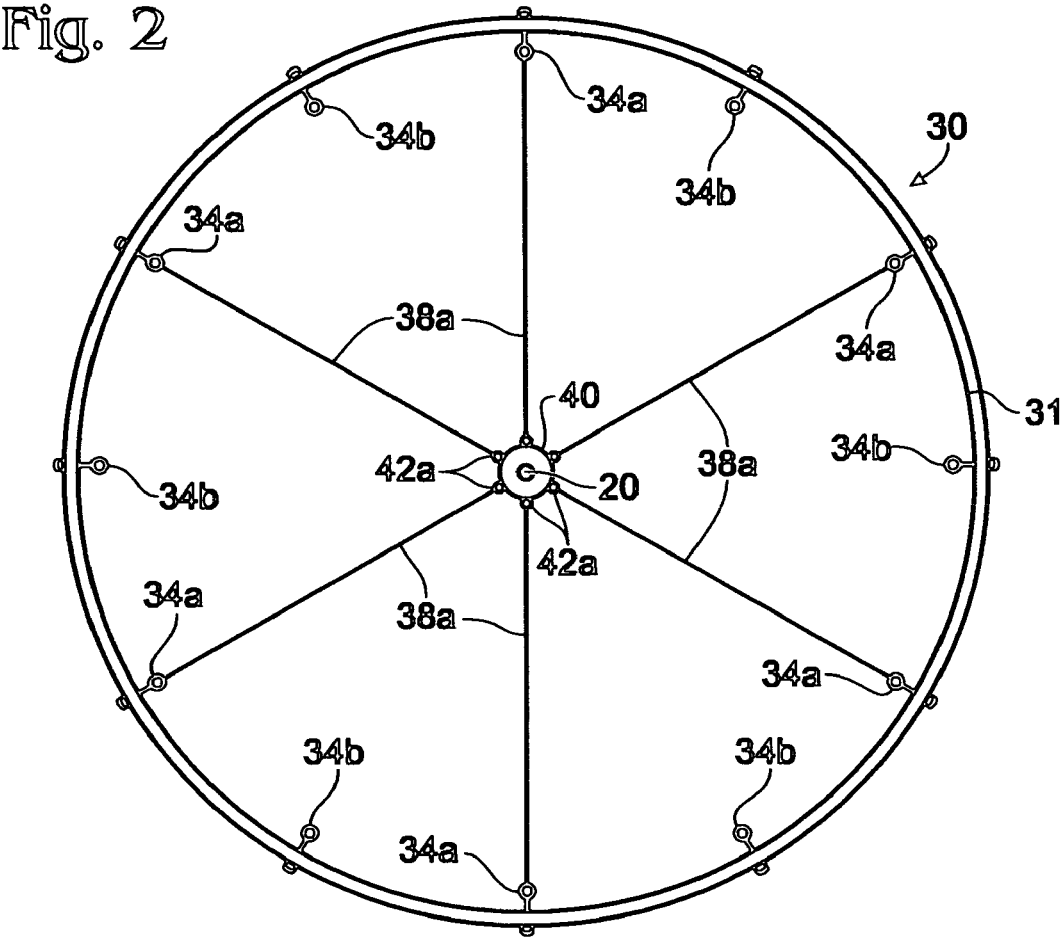
FIG. 2 is a front elevation view of the rim, stay and hub framework of a single wheel of the wind machine of the present invention.

The kaleidoscopic wind machine 10 of the present invention includes a tubular mast 12 pivotally attached to a base 14. A tubular vertical axle 16 is positioned inside mast 12, as best seen in FIG. 6. The longitudinal axis of vertical axle 16 is coextensive with the longitudinal axis of tubular mast 12, and vertical axle 16 is rotatable around the longitudinal axis of mast 12.

A tubular horizontal axle 20 is attached perpendicularly to the outer end of vertical axle 16 by means of attachment fitting 22. Attachment fitting 22 divides axle 20 into an upwind end and a downwind end.

Tubular vertical and horizontal axles 16 and 20 are preferably made of stainless steel. A steel reinforcing bar (not shown) may be inserted through horizontal axle 20.

Three wheels 30, 130, and 230 are rotatably attached to horizontal axle 20. Although the invention will be described relative to a preferred embodiment where wind machine 10 has three wheels 30, 130, and 230, it is to be understood that this is not a limiting number.

Wheel 30 is an upwind wheel that is rotatably attached to axle 20 on its upwind end. Wheel 130 is an intermediate wheel that is rotatably attached to axle 20 on its upwind end between upwind wheel 30 and attachment fitting 22. Wheel 230 is a downwind wheel rotatably attached to axle 20 on its downwind end.

Wheels 30, 130, and 230 are identical in structure, differing only in their diameters, as shown. Wheel 30 will be described in detail, it being understood that wheels 130 and 230 would have corresponding and identical structural characteristics, differing only in size. The reference numbers used to describe the various parts of wheel 30 are increased by 100 and 200 to describe the corresponding parts of wheels 130 and 230, respectively.

Figure 4:
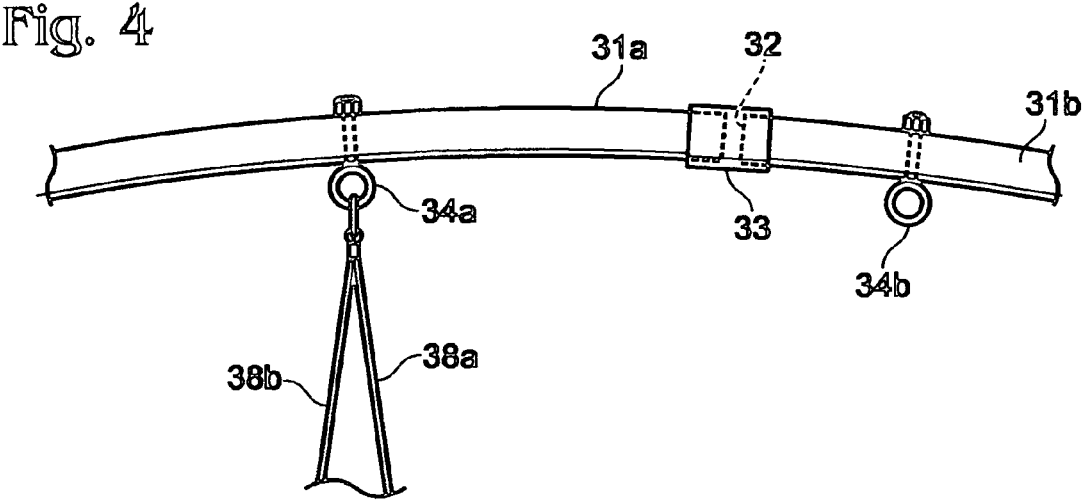
FIG. 4 is a partial front view in cross-section of a portion of the rim of a single wheel of the wind machine of the present invention.

Wheel 30 includes a circular rim 31 comprised of two or more tubular sections 31*a*, 31*b*, etc., joined together at joints 32 by a coupling union 33, as best seen in FIG. 4. Tubular sections 31 are, preferably, made of bendable polyvinyl chloride ("PVC") tubing. Tubular sections 31 are bent into a circle on a jig and the ends joined. A bendable steel reinforcing bar (not shown) may be inserted into tubular sections 31 prior to bending.

A plurality of rim eye bolts 34*a*, 34*b* are attached to rim 31, preferably 30 degrees apart.

A plurality of fore and aft stays 38*a* and 38*b*, respectively, extend between, and are attached to, rim eye bolts 34*a* and hub eye bolts 42*a* and 42*c*, respectively. Similarly, stays 38'*a* and 38'*b* extend between, and are attached to rim eye bolts 34*a* and hub eye bolts 42'*a* and 42'*c*, respectively. Hub eye bolts 42*a*, 42'*a*, 42*c* and 42'*c* are positioned equidistantly around tubular hub 40, preferably 60 degrees apart. Stays 38 are attached at their upper ends to every other rim eye bolt (designated as 34a in the drawings). However, for larger wheels, stays 38 may be attached to every rim eye bolt 34a and 34b.

Figure 3:
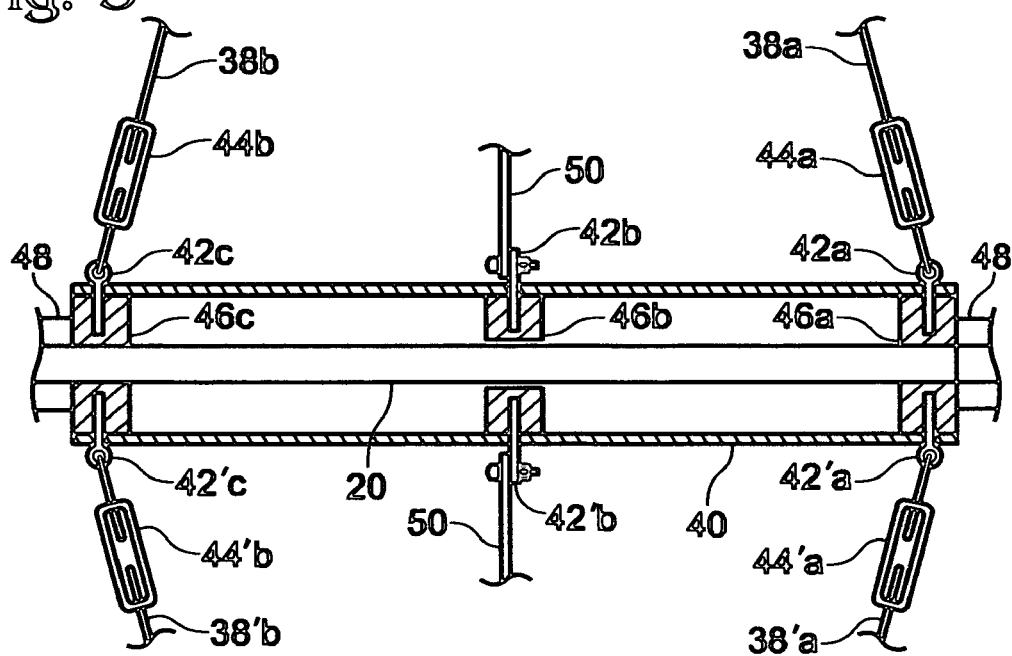
FIG. 3 is a side view in cross-section of a hub for securing a single wheel to the horizontal axle of the wind machine of the present invention.

As best seen in FIG. 3, the lower ends of each of the fore stay portions 38a and 38'a are attached to the forward hub eyebolts 42a and 42'a by means of turnbuckles 44a and 44'a, respectively, and the lower ends of each of the aft stay portions 38b and 38'b are attached to the rear hub eyebolts 42c and 42'c by means of turnbuckles 44b and 44'b, respectively. Turnbuckles 44 are used to tighten stays 38.

As seen in FIG. 3, tubular hub 40 is rotatably attached to axle 20 by means of bearing bushings 46a, 46b and 46c. Eyebolts 42 are positioned into bearing bushings 46 so that there is no slippage between the outer surface of the bushings 46 and the inner surface of hub 40.

Spacing bushings 48 keep the hubs of the wheels 30, 130, and 230 properly positioned on axle 20.

Figure 5:
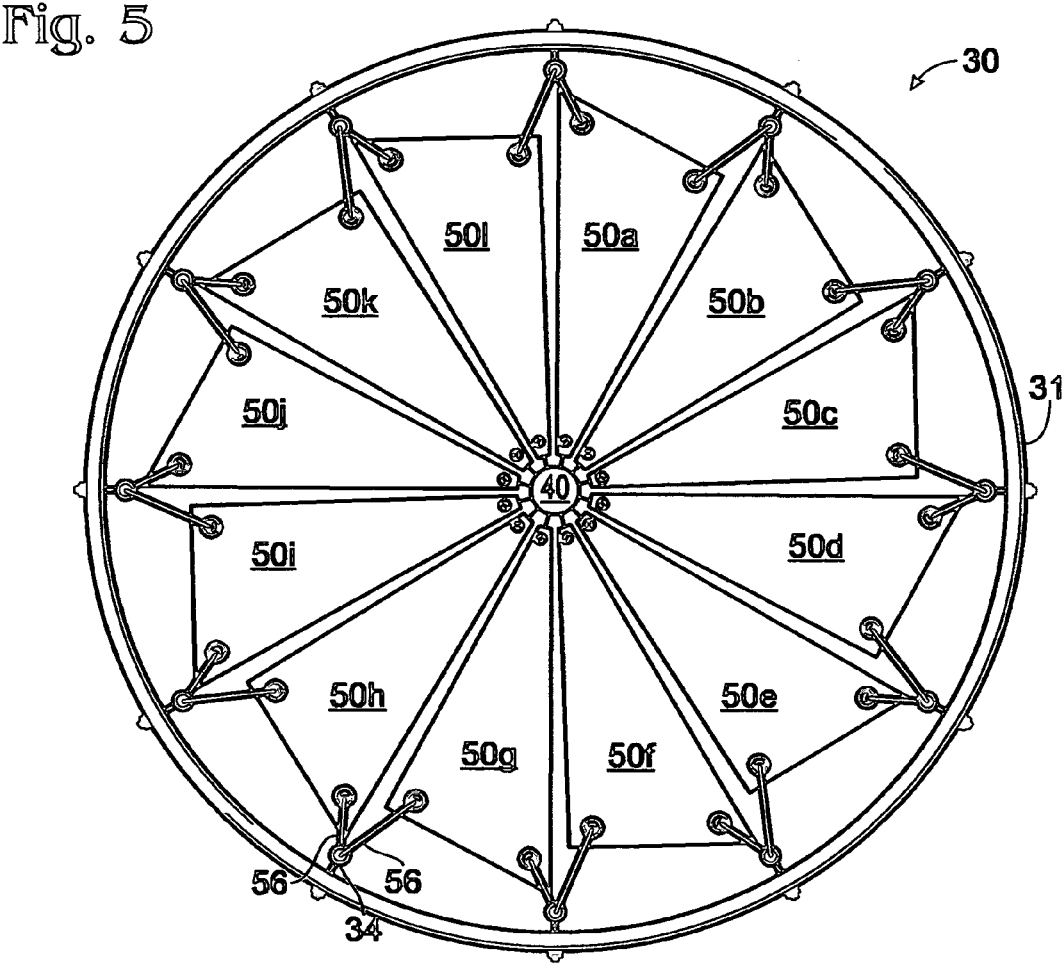
FIG. 5 is a front elevation view of a single wheel showing the jib sails rigged to the wheel framework of the wind machine of the present invention.

The rigging of jib sails 50 onto wheel 30 and hub 40 is shown in FIG. 5, it being understood that the rigging of jib sails onto wheels 130 and 230 is accomplished in a similar manner.

As best seen in FIG. 5A, each jib sail 50 is a generally triangular piece of sailcloth, such as Dacron. Each jib sail 50 has a short base 51 (the "foot") and two longer sides 52 and 53 that come closely together at truncated apex 54 (the "head"). As seen in FIG. 5, the foot 51 of each sail 50 is positioned adjacent rim 31 with the head 54 of each sail 50 being located adjacent hub 40.

Grommets 55a and 55b are located at each end of foot 51. A cord or cords 56 passing through grommets 55a and 55b of adjacent jib sails 50 is used to tie those corners of the adjacent sails to the adjacent eye bolt 34. Alternatively, nuts and bolts may be used in place of cords 56 to attach the feet 51 of jib sails 50 to adjacent eyebolts 34.

Grommets 55c located at the head 54 of jib sails 50 are attached to eyebolts 42b and 42'b by nuts and bolts, as best seen in FIG. 3.

The jib sails 50 are decorated to provide a pleasing visual image when the wheels are rotating. Many combinations of colors and/or designs may be used. For example, a patriotic theme would have alternating red, white and blue colored jib sails. The colors could be selected to represent school or corporate colors. One particularly visually effective combination is to use the colors of the spectrum arranged in order of wavelength.

As seen in FIG. 1, a positioning vane 60 is rotatably attached to the rear (trailing) end of horizontal axle 20. Positioning vane 60 has three identically constructed tail sections 62, only two of which (62a and 62b)) are shown in FIG. 1. The major planes of tail sections 62 all pass through the longitudinal axis of horizontal axle 20, and are spaced 120 degrees apart. Therefore, the upper tail section 62b is shown foreshortened in FIG. 1 since it extends out of the plane of drawing.

As best seen in FIGS. 1 and 7, each tail section 62 includes a tubular vertical frame member 63 and a tubular horizontal frame member 64. Tubular frame members 63 and 64 are preferably made of stainless steel. Horizontal frame member 64 passes through an opening in union member 65 and is attached thereto by threaded fastening members. Vertical frame member 63 is inserted into an opening in union member 65 and attached thereto by a threaded fastening member. A tail section jib sail 66 is attached to vertical and horizontal frame members 63 and 64 by nuts and bolts passing through grommets located adjacent the corners of the sail, as shown, and eyebolts 67a–d attached to vertical and horizontal frame members 63 and 64.

Eyebolts 68a, b extend from vertical and horizontal frame members 63 and 64, respectively, and are attached to a turnbuckle 69 to provide bracing for the tail section frame.

A wire or wires may be passed through the outer eye bolts and/or bodies of turnbuckles 44 to prevent their rotating and becoming unfastened during use of the device.

Figure 8:
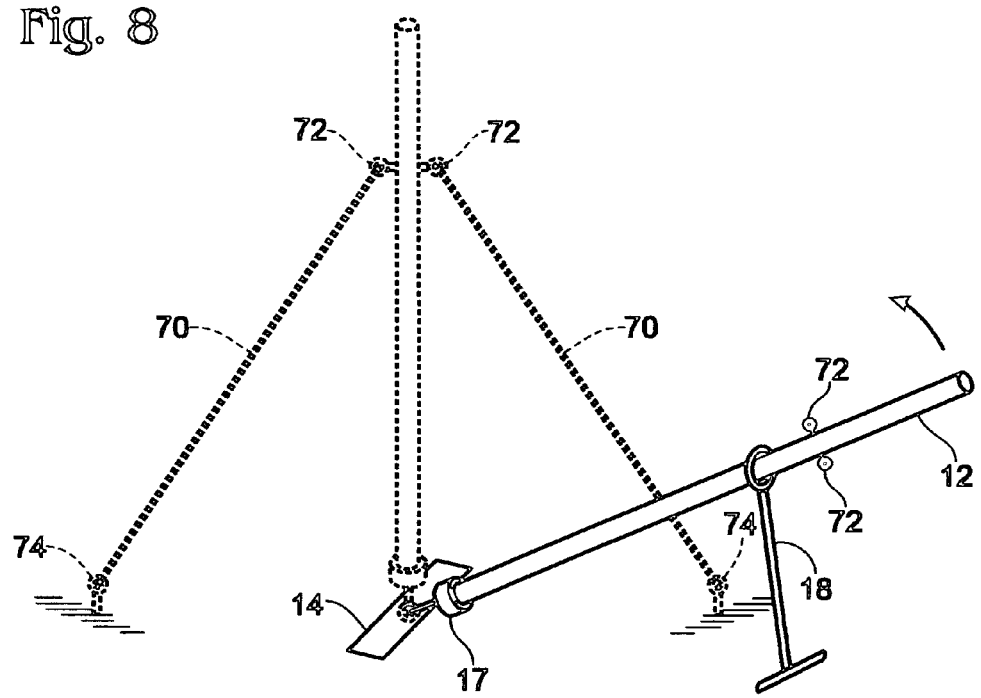
FIG. 8 is a perspective view of the wind machine of the present invention during assembly and, in phantom, the wind machine in its raised position.

In operation, base 14, which can be a metal plate with pivot ears 15 extending therefrom (FIG. 8), is affixed to the ground, such as by bolting to a poured-in-place concrete pad (not shown). Pivot head 17, threadably attached to the base of mast 12, is pivotally attached to pivot ears 15 by means of a threaded fastener and associated washers. A removable jack member 18 is pivotally attached to mid-portion of mast 12, and allows mast 12 to be rested at the approximate angle shown in FIG. 8. Vertical axle 16 of the vertical/horizontal axle subassembly is then inserted into tubular mast 12 until the top of mast 12 abuts against the bottom of stop member 19. Wheels 30, 130 and 230, and positioning vane 60, are placed onto horizontal axle 20, being spaced apart by spacer members such as spacer members 48. Wheels 30, 130 and 230 are free to rotate about horizontal axle 20.

Mast 12 is then raised into a vertical position (in the direction of the arrow in FIG. 8) and four mainstays 70 (only two of which are shown and which have previously been attached at one end to one of four mainstay eyebolts 72) attached to suitable staking members 74 which have been driven into the ground.

As the wind blows against the jib sails of wheels 30, 130, and 230, the wheels rotate about axle 20. As mentioned above, it is preferable to rig the angle of the sails so that wheels 30 and 230 rotate clockwise and wheel 130 rotates counterclockwise. Positioning vane 60 keeps the upwind end of axle 20 pointed into the wind so that the planes of wheels 30, 130, and 230 remain substantially perpendicular to the direction of the wind at all times.

Although the kaleidoscopic wind machine 10 of the present invention can be made of many different sizes, it is desirable that it be large enough to be seen from some distance, yet not so large as to cause structural problems in construction or operation.

It will be obvious to those having skill in the art that many changes may be made to the details of the above-described embodiments of this invention without departing from the underlying principles thereof. The scope of the present invention should, therefore, be determined only by the following claims.

What is claimed is:

1. A kaleidoscopic wind machine comprising:
    a vertically disposed mast;
    a horizontally disposed axle attached to said mast by an attachment fitting in a manner adapted to allow said axle to swivel around said mast, said attachment fitting dividing said axle into an upwind end and a downwind end;
    at least one upwind wheel rotatably attached to said axle on said upwind end, at least one downwind wheel rotatably attached to said axle on said downwind end, each of said wheels including a rim, a hub, a plurality of stays extending between said rim and said hub, and a plurality of decorative sails extending between said rim and said hub; and
    a positioning vane attached to said axle downwind of said downwind wheel and adapted to cause the upwind end of said axle to point into the wind.

2. The wind machine of claim 1 wherein said plurality of sails of said upwind and downwind wheels are rigged at an angle adapted to cause said upwind and downwind wheels to rotate in opposite directions.

3. The wind machine of claim 1 including an intermediate wheel rotatably attached to said axle on said upwind end and between said upwind wheel and said attachment fitting.

4. The wind machine of claim 3 wherein said upwind wheel has a smaller diameter than said intermediate wheel, and said intermediate wheel has a smaller diameter than said downwind wheel.

5. The wind machine of claim 3 wherein said plurality of sails of said upwind, intermediate and downwind wheels are rigged at an angle adapted to cause said upwind and intermediate wheels to rotate in opposite directions, and to cause said intermediate and downwind wheels to rotate in opposite directions.

6. The wind machine of claim 1 wherein said mast is tubular and has an upper and lower end, said mast including a vertical axle having an upper and lower end positioned inside said mast and adapted to rotate within said mast, the upper end of said vertical axle being attached to said horizontally disposed axle by said attachment fitting.

* * * * *